United States Patent
Senner

(10) Patent No.: US 8,007,943 B2
(45) Date of Patent: Aug. 30, 2011

(54) CASCADED STACK WITH GAS FLOW RECYCLE IN THE FIRST STAGE

(75) Inventor: Ralf Senner, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1203 days.

(21) Appl. No.: 11/266,605

(22) Filed: Nov. 3, 2005

(65) Prior Publication Data

US 2007/0099037 A1    May 3, 2007

(51) Int. Cl.
H01M 8/00 (2006.01)
H01M 8/06 (2006.01)
H01M 8/24 (2006.01)

(52) U.S. Cl. ......... 429/400; 429/408; 429/415; 429/452

(58) Field of Classification Search ............... 429/12–46
See application file for complete search history.

(56) References Cited

U.S. PATENT DOCUMENTS

| | | | |
|---|---|---|---|
| 5,478,662 A | 12/1995 | Strasser | |
| 5,935,726 A | 8/1999 | Chow et al. | |
| 6,015,634 A * | 1/2000 | Bonville et al. | 429/17 |
| 6,344,289 B2 | 2/2002 | Dekker et al. | |
| 6,497,975 B2 * | 12/2002 | Bostaph et al. | 429/415 |
| 6,528,191 B1 | 3/2003 | Senner | |
| 6,740,433 B2 | 5/2004 | Senner | |
| 2001/0036566 A1 * | 11/2001 | Dekker et al. | 429/19 |
| 2004/0001982 A1 | 1/2004 | Reiser | |
| 2004/0166383 A1 * | 8/2004 | Schafer | 429/13 |
| 2004/0229087 A1 | 11/2004 | Senner et al. | |

FOREIGN PATENT DOCUMENTS

| | | |
|---|---|---|
| DE | 10 2004 008 703 A1 | 9/2004 |
| DE | 10 2004 008 704 A1 | 9/2004 |
| JP | 8-203547 (A) | 8/1996 |
| JP | 2002-298889 A | 10/2002 |
| JP | 2005-019331 (A) | 1/2005 |
| JP | 2005-032685 (A) | 2/2005 |
| JP | 2005-158558 A | 6/2005 |

OTHER PUBLICATIONS

Kim et al., Development of Blower for Air Management System of Fuel Cell Modules, Jul. 2007, Proceedings of World Academy of Science, Engineering and Technology vol. 22, p. 212.*
Motor. (n.d.) The American HeritageÂ® Dictionary of the English Language, Fourth Edition. (2003). Retrieved Feb. 2, 2010 from http://www.thefreedictionary.com/motor.*
Compressor. (n.d.) The American Heritage® Dictionary of the English Language, Fourth Edition. (2003). Retrieved Feb. 2, 2010 from http://www.thefreedictionary.com/compressor.*

* cited by examiner

Primary Examiner — Barbara L Gilliam
Assistant Examiner — Adam A Arciero
(74) Attorney, Agent, or Firm — John A. Miller; Miller IP Group, PLC

(57) ABSTRACT

A fuel cell system including a humidification system is described. The humidification system employs a recycling system that recycles relatively humid gas exhausted from a multistage fuel cell stack, either on the anode and/or cathode side, and sends this relatively humid gas back to be combined with relatively dry supply gas, such as but not limited to hydrogen and/or air. The humidified supply gas mixture is then reintroduced into the first stage of the multistage fuel cell stack. A recirculation device, such as but not limited to a pump and/or an ejector, can be used to aid in moving the humid exhaust gas back through a recycle gas line to be combined with the supply gas.

42 Claims, 4 Drawing Sheets

CASCADED STACK WITH GAS FLOW RECYCLE IN THE FIRST STAGE

FIELD OF THE INVENTION

The present invention relates generally to fuel cell systems, and more particularly to new and improved gas flow recycle systems for use in fuel cell systems.

BACKGROUND OF THE INVENTION

Fuel cells have been used as a power source in many applications. For example, fuel cells have been proposed for use in electrical vehicular power plants to replace internal combustion engines. In PEM-type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements, sometimes referred to as the gas diffusion media components, that: (1) serve as current collectors for the anode and cathode; (2) contain appropriate openings therein for distributing the fuel cell's gaseous reactants over the surfaces of the respective anode and cathode catalysts; (3) remove product water vapor or liquid water from electrode to flow field channels; (4) are thermally conductive for heat rejection; and (5) have mechanical strength. The term fuel cell is typically used to refer to either a single cell or a plurality of cells (e.g., a stack) depending on the context. A plurality of individual cells are commonly bundled together to form a fuel cell stack and are commonly arranged in series. Each cell within the stack comprises the MEA described earlier, and each such MEA provides its increment of voltage.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

Examples of technology related to PEM and other related types of fuel cell systems can be found with reference to commonly-assigned U.S. Pat. No. 3,985,578 to Witherspoon et al.; U.S. Pat. No. 5,272,017 to Swathirajan et al.; U.S. Pat. No. 5,624,769 to Li et al.; U.S. Pat. No. 5,776,624 to Neutzler; U.S. Pat. No. 6,103,409 to DiPierno Bosco et al.; U.S. Pat. No. 6,277,513 to Swathirajan et al.; U.S. Pat. No. 6,350,539 to Woods, III et al.; U.S. Pat. No. 6,372,376 to Fronk et al.; U.S. Pat. No. 6,376,111 to Mathias et al.; U.S. Pat. No. 6,521,381 to Vyas et al.; U.S. Pat. No. 6,524,736 to Sompalli et al.; U.S. Pat. No. 6,528,191 to Senner; U.S. Pat. No. 6,566,004 to Fly et al.; U.S. Pat. No. 6,630,260 to Forte et al.; U.S. Pat. No. 6,663,994 to Fly et al.; U.S. Pat. No. 6,740,433 to Senner; U.S. Pat. No. 6,777,120 to Nelson et al.; U.S. Pat. No. 6,793,544 to Brady et al.; U.S. Pat. No. 6,794,068 to Rapaport et al.; U.S. Pat. No. 6,811,918 to Blunk et al.; U.S. Pat. No. 6,824,909 to Mathias et al.; U.S. Patent Application Publication Nos. 2004/0229087 to Senner et al.; 2005/0026012 to O'Hara; 2005/0026018 to O'Hara et al.; and 2005/0026523 to O'Hara et al., the entire specifications of all of which are expressly incorporated herein by reference.

The membranes of PEM fuel cells should be kept in humid conditions in order to achieve high performance and durability. Therefore, if operated at elevated temperatures, fuel cell systems usually require a humidification device for the feed gases, air and/or hydrogen. It has been shown that the fuel gas, which is fed to the anode of the fuel cell stack, requires humidification in order to prevent the fuel cell stack from drying at the fuel inlet. Along the internal channels of the fuel cell stack, there is an increase in water content that causes a humidity gradient in the electrolyte membrane, and inhomogeneous power distribution. The inhomogeneous power distribution might lead to hot spots in some areas, and to excessive water accumulation in other areas, which again has a negative affect on performance and durability. Furthermore, humidification devices have several disadvantages, especially for automotive applications of the fuel cell stack, as they are heavy, expensive, and sometimes, due to the water they contain, subject to freezing at low ambient temperatures.

Previous solutions of the humidification problem involved membrane humidifiers and water injection methods, as well as humid gas recirculation, including those described in U.S. Pat. No. 5,478,662 to Strasser and U.S. Pat. No. 5,935,726 to Chow et al., the entire specifications of which are expressly incorporated herein by reference.

Recirculation methods take advantage of the fact that gases at the fuel cell outlets are humidified with the water produced in the fuel cell, and can be fed back at the fuel cell inlet in order to bring the humidity there without having liquid water involved. A disadvantage is the need for a recirculation pump, the power consumption of the pump and the humidity gradient in a stack along the channel.

Also, the switching of oxidizing feed gas between cathode gas inlets and outlets of the fuel cell has been proposed. The advantage provided by that system is the better homogeneity of humidity in the fuel cell as the dry feed gas is alternating in one and the other direction in the channel. The feed gas, however, is suggested to be the oxidant, and is dry, which might lead to performance degradation at both gas inlets.

Accordingly, there exists a need for new and improved gas flow recycle systems that provide improved humidification distribution within the fuel cell.

SUMMARY OF THE INVENTION

In accordance with one embodiment of the present invention, a fuel cell system is provided, comprising: (1) a first fuel cell stack having a fuel or oxidant gas inlet operable to receive an amount of fuel or oxidant gas; (2) a second fuel cell stack having an exhaust gas outlet operable to exhaust an amount of exhaust gas, wherein the first and second fuel cell stacks are in fluid communication; and (3) a gas recirculation system in fluid communication with the first and second fuel cell stacks, wherein the gas recirculation system is operable to receive the exhaust gas from the exhaust gas outlet and reintroduce the exhaust gas into the first fuel cell stack, wherein the exhaust gas has a higher moisture level than the fuel or oxidant gas.

In accordance with a first alternative embodiment of the present invention, a fuel cell system is provided, comprising: (1) a first fuel cell stack having a fuel or oxidant gas inlet operable to receive an amount of fuel or oxidant gas and an exhaust gas outlet operable to exhaust an amount of exhaust gas; and (2) a gas recirculation system in fluid communication with the first fuel cell stack, wherein the gas recirculation system is operable to receive the exhaust gas from the exhaust gas outlet and reintroduce the exhaust gas into the first fuel cell stack, wherein the exhaust gas has a higher moisture level than the fuel or oxidant gas.

In accordance with a second alternative embodiment of the present invention, a method of operating a fuel cell system is provided, comprising: (1) providing a first fuel cell stack having a fuel or oxidant gas inlet operable to receive an amount of fuel or oxidant gas; (2) providing a second fuel cell stack having an exhaust gas outlet operable to exhaust an amount of exhaust gas, wherein the first and second fuel cell stacks are in fluid communication; and (3) providing a gas recirculation system in fluid communication with the first and second fuel cell stacks, wherein the gas recirculation system is operable to receive the exhaust gas from the exhaust gas outlet and reintroduce the exhaust gas into the first fuel cell stack, wherein the exhaust gas has a higher moisture level than the fuel or oxidant gas.

In accordance with a third alternative embodiment of the present invention, a method of operating a fuel cell system is provided, comprising: (1) providing a first fuel cell stack having a fuel or oxidant gas inlet operable to receive an amount of fuel or oxidant gas and an exhaust gas outlet operable to exhaust an amount of exhaust gas; and (2) providing a gas recirculation system in fluid communication with the first fuel cell stack, wherein the gas recirculation system is operable to receive the exhaust gas from the exhaust gas outlet and reintroduce the exhaust gas into the first fuel cell stack, wherein the exhaust gas has a higher moisture level than the fuel or oxidant gas.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

By "fluid," as that term is used herein, it is meant any gaseous and/or liquid material, such as but not limited to liquid water, water vapor, and combinations thereof.

Figure 1:
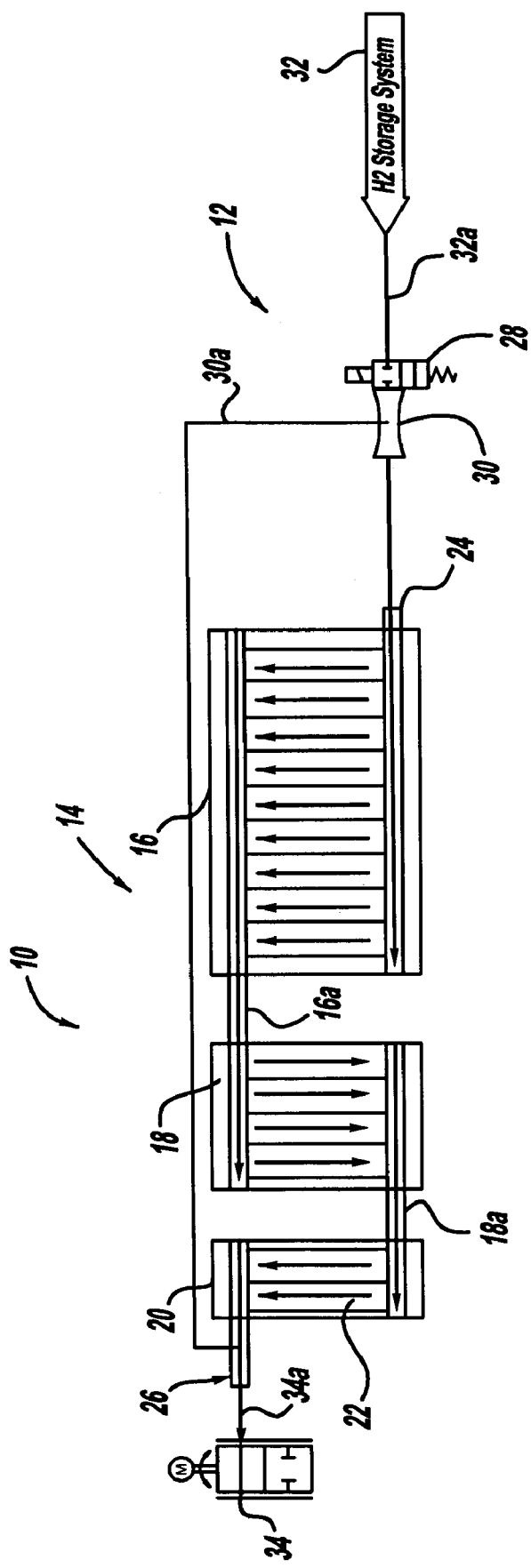
FIG. 1 is a schematic illustration of a three stack fuel cell system having a humidification/gas recirculation system operably associated with the anode side, in accordance with the general teachings of the present invention.

Referring to FIG. 1, there is shown a schematic illustration of a three stack fuel cell system 10 having a humidification/gas recirculation system 12 operably associated with the stack anode flow 14 side, in accordance with one embodiment of the present invention.

The fuel cell system 10 includes three fuel cell stacks, 16, 18, 20, respectively, that are in fluid communication with one another, or at least with an adjacent fuel cell stack. The fuel cell stacks 16, 18, 20, respectively, are comprised of a number of individual fuel cell elements 22. The number of fuel cell elements 22 can be varied among the fuel cell stacks 16, 18, 20, respectively. Conduits 16a and 18a can be provided to provide fluid communication between fuel cell stack 16/fuel cell stack 18 and fuel cell stack 18/fuel cell stack 20, respectively.

Fuel cell stack 16 is provided with a fuel gas inlet 24 (e.g., an stack anode inlet) operable to receive an amount of fuel gas, and fuel cell stack 20 is provided with an exhaust outlet 26 (e.g., a stack anode outlet) operable to exhaust an amount of exhaust gas. Fuel gas inlet 24 is in fluid communication with a flow control valve 28 which is in fluid communication with the humidification/gas recirculation system 12. The humidification/gas recirculation system 12 can include a humidification/gas recirculation device 30. The humidification/gas recirculation device 30 can include a pump, ejector, injector (e.g., a Venturi injector) and combinations thereof.

The humidification/gas recirculation device 30 is in fluid communication with a fuel gas storage/supply source 32, e.g., via conduit 32a. By way of a non-limiting example, the fuel gas can be comprised of hydrogen. Exhaust outlet 26 is in fluid communication with a pressure control valve 34, e.g., via conduit 34a. The humidification/gas recirculation system 12, and more specifically the humidification/gas recirculation device 30, can be in fluid communication with either the exhaust outlet 26 and/or conduit 34a, e.g., via conduit 30a.

Because the exhaust gas exiting the fuel cell system 10 is typically higher in moisture than the fuel gas being introduced into the fuel cell system 10, the present invention employs the humidification/gas recirculation system 12, and more specifically the humidification/gas recirculation device 30, to provide a method for reintroducing the relatively moist and/or humid exhaust gas (e.g., from conduit 30a) back into the first fuel stack 16 after it has exiting the third fuel cell stack 20. However, it should be appreciated that the exhaust gas can be re-circulated after it has exited either of the first and/or second fuel cell stacks 16, 18, respectively.

Due to the fact that the exhaust gas leaves the first fuel stack 16 (and subsequent fuel cell stacks) at a lower pressure than the incoming fuel gas, the humidification/gas recirculation system 12, and more specifically the humidification/gas recirculation device 30, employs a device to mix both of the gas streams (i.e., the exhaust gas and the fuel gas). As previously described, this device can be a pump, ejector, injector, or a combination thereof, that are operable to increase the pressure of the re-circulated exhaust gas to the required value. In this manner, the relatively dry incoming fuel gas can be mixed with at least a portion of the relatively moist and/or humid exhaust gas of either the first, second and/or third fuel cell stacks 16, 18, 20, respectively. Once mixed, the gas mixture (i.e., the relatively moist and/or humid exhaust gas and the relatively dry fuel gas) can then be introduced back into the fuel cell system 10, and more specifically, the first fuel cell stack 16.

Figure 2:
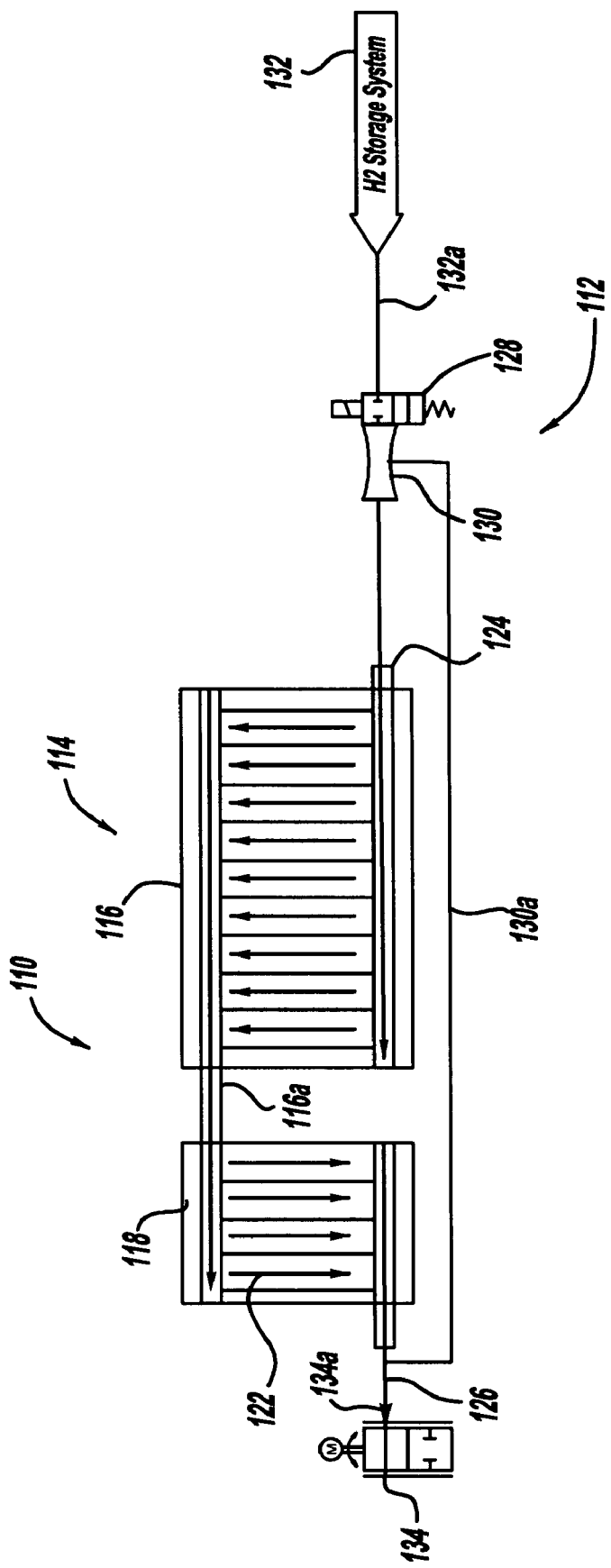
FIG. 2 is a schematic illustration of a two stack fuel cell system having a humidification/gas recirculation system operably associated with the anode side, in accordance with the general teachings of the present invention.

Referring to FIG. 2, there is shown a schematic illustration of a two stack fuel cell system 110 having a humidification/gas recirculation system 112 operably associated with the stack anode flow 114 side, in accordance with a first alternative embodiment of the present invention.

The fuel cell system 110 includes two fuel cell stacks, 116, 118, respectively, that are in fluid communication with one another. The fuel cell stacks 116, 118, respectively, are comprised of a number of individual fuel cell elements 122. The number of fuel cell elements 122 can be varied among the fuel cell stacks 116, 118, respectively. Conduit 116a can be provided to provide fluid communication between fuel cell stack 116 and fuel cell stack 118.

Fuel cell stack 116 is provided with a fuel gas inlet 124 (e.g., an stack anode inlet) operable to receive an amount of fuel gas, and fuel cell stack 118 is provided with an exhaust outlet 126 (e.g., a stack anode outlet) operable to exhaust an amount of exhaust gas. Fuel gas inlet 124 is in fluid communication with a flow control valve 128 which is in fluid communication with the humidification/gas recirculation system 112. The humidification/gas recirculation system 112 can include a humidification/gas recirculation device 130. The humidification/gas recirculation device 130 can include a pump, ejector, injector (e.g., a Venturi injector) and combinations thereof.

The humidification/gas recirculation device 130 is in fluid communication with a fuel gas storage/supply source 132, e.g., via conduit 132a. By way of a non-limiting example, the fuel gas can be comprised of hydrogen. Exhaust outlet 126 is in fluid communication with a pressure control valve 134, e.g., via conduit 134a. The humidification/gas recirculation system 112, and more specifically the humidification/gas recirculation device 130, can be in fluid communication with either the exhaust outlet 126 and/or conduit 134a, e.g., via conduit 130a.

As with the previous embodiment, because the exhaust gas exiting the fuel cell system 110 is typically higher in moisture than the fuel gas being introduced into the fuel cell system 110, the present invention employs the humidification/gas recirculation system 112, and more specifically the humidification/gas recirculation device 130, to provide a method for reintroducing the relatively moist and/or humid exhaust gas back into the first fuel stack 116 (e.g., from conduit 130a) after it has exiting the second fuel cell stack 118. However, it should be appreciated that the exhaust gas can be re-circulated after it has exited the first fuel cell stack 116.

Due to the fact that the exhaust gas leaves the first fuel stack 116 (as well as the second fuel cell stack 118) at a lower pressure than the incoming fuel gas, the humidification/gas recirculation system 112, and more specifically the humidification/gas recirculation device 130, employs a device to mix both of the gas streams (i.e., the exhaust gas and the fuel gas). As previously described, this device can be a pump, ejector, injector, or a combination thereof, that are operable to increase the pressure of the re-circulated exhaust gas to the required value. In this manner, the relatively dry incoming fuel gas can be mixed with at least a portion of the relatively moist and/or humid exhaust gas of either the first and/or second fuel cell stacks 116, 118, respectively. Once mixed, the gas mixture (i.e., the relatively moist and/or humid exhaust gas and the relatively dry fuel gas) can then be introduced back into the fuel cell system 110, and more specifically, the first fuel cell stack 116.

Figure 3:
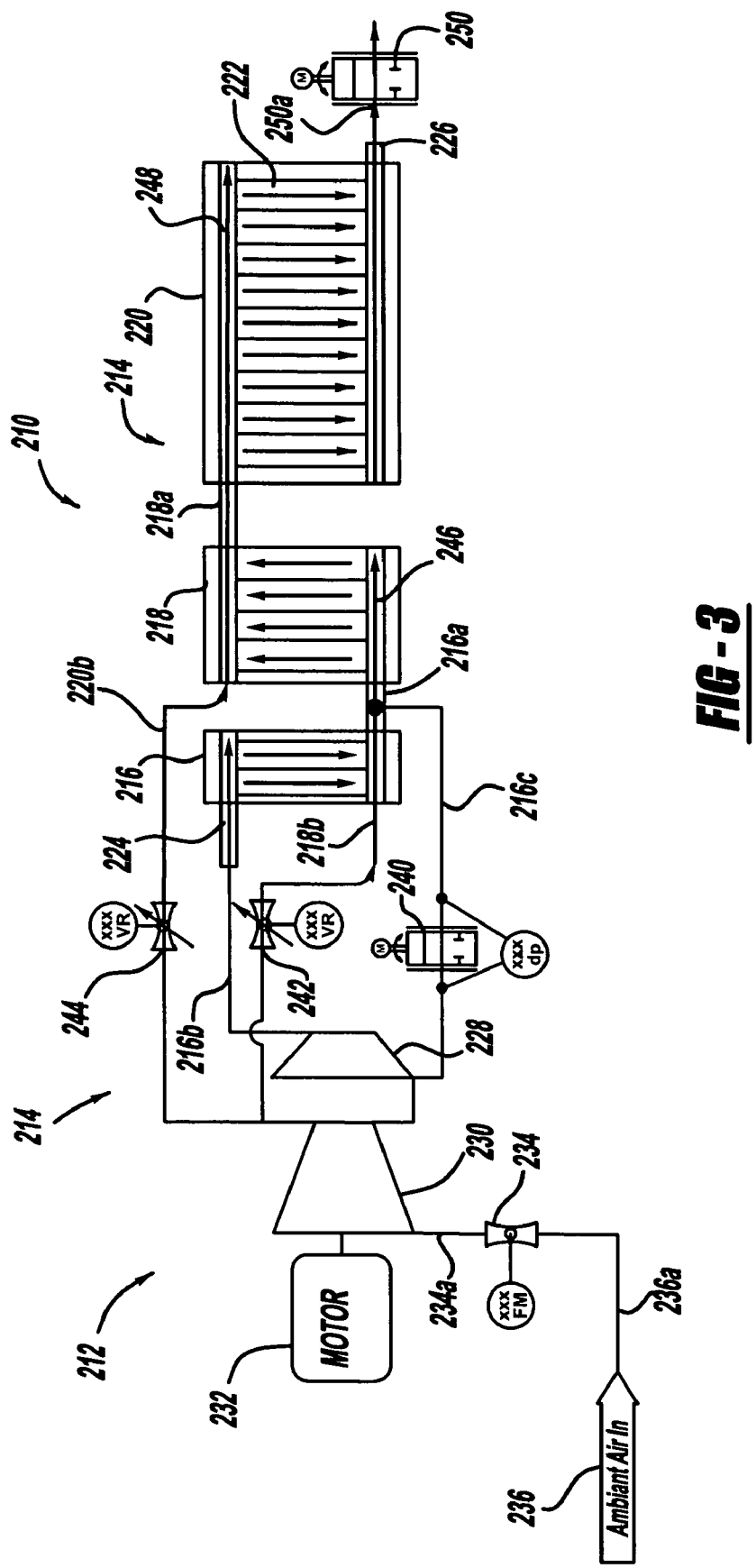
FIG. 3 is a schematic illustration of a three stack fuel cell system having a humidification/gas recirculation system operably associated with the cathode side, in accordance with the general teachings of the present invention.

Referring to FIG. 3, there is shown a schematic illustration of a three stack fuel cell system 210 having a humidification system 212 operably associated with the stack cathode flow 214 side, in accordance with a second alternative embodiment of the present invention.

The fuel cell system 210 includes three fuel cell stacks, 216, 218, 220, respectively, that are in fluid communication with one another, or at least with an adjacent fuel cell stack. The fuel cell stacks 216, 218, 220, respectively, are comprised of a number of individual fuel cell elements 222. The number of fuel cell elements 222 can be varied among the fuel cell stacks 216, 218, 220, respectively. Conduits 216a and 218a can be provided to provide fluid communication between fuel cell stack 216/fuel cell stack 218 and fuel cell stack 218/fuel cell stack 220, respectively.

Fuel cell stack 216 is provided with an oxidant gas inlet 224 (e.g., an stack cathode inlet) operable to receive an amount of oxidant gas, and fuel cell stack 220 is provided with an exhaust outlet 226 (e.g., a stack cathode outlet) operable to exhaust an amount of exhaust gas. Oxidant gas inlet 224 is in fluid communication with at least one compressor 228. Compressor 228 can also be operably associated and/or in fluid communication with another compressor 230. Compressors 228, 230, respectively, can be powered by motor 232.

Compressors 228, 230, respectively, can be in fluid communication with a flow meter 234, via conduit 234a, which is in fluid communication with an oxidant gas storage/supply source 236, e.g., via conduit 236a. By way of a non-limiting example, the oxidant can be comprised of air, e.g., ambient air.

In this embodiment, the compressors 228, 230, respectively, and any associated components as previously described, comprise the humidification/gas recirculation system 212. However, instead of employing pumps, ejectors and/or injectors, the humidification/gas recirculation system 212 employs the compressors 228, 230, respectively to accomplish the recirculation function.

Compressors 228, 230, respectively, are in fluid communication, either directly or indirectly, with any of the fuel cell stacks, 216, 218, 220, respectively, e.g. through conduits 216b, 218b, 220b, respectively. A recycle flow control valve 240 can be disposed in conduit 216c and flow control valves 242, 244, respectively, can be disposed in conduits 218b, 220b, respectively. In this manner direct inputs 246, 248, respectively, can be provided for fuel cell stacks 218, 220, respectively, from humidification/gas recirculation system 212, and more specifically compressors 228, 230, respectively. Additionally, a pressure control valve 250 can be provided that is in fluid communication with exhaust outlet 226, e.g., via conduit 250a.

Because the exhaust gas exiting the fuel cell system 210 is typically higher in moisture than the oxidant gas being introduced into the fuel cell system 210, the present invention employs the humidification/gas recirculation system 212, and more specifically the compressors, 228, 230, respectively, to provide a method for reintroducing the relatively moist and/or humid exhaust gas (e.g., from conduit 216c) back into the first fuel stack 216 after it has exiting the first fuel cell stack 216. However, it should be appreciated that the exhaust gas can be re-circulated after it has exited either of the second and/or third fuel cell stacks 218, 220, respectively.

Due to the fact that the exhaust gas leaves the first fuel stack 216 (and subsequent fuel cell stacks) at a lower pressure than the incoming oxidant gas, humidification/gas recirculation system 212, and more specifically the compressors, 228, 230, respectively, are employed to mix both of the gas streams (i.e., the exhaust gas and the oxidant gas). The compressors, 228, 230, respectively, are operable to increase the pressure of the re-circulated exhaust gas to the required value. In this manner, the relatively dry incoming oxidant gas can be mixed with at least a portion of the relatively moist and/or humid exhaust gas of either the first, second and/or third fuel cell stacks 216, 218, 220, respectively. Once mixed, the gas mixture (i.e., the relatively moist and/or humid exhaust gas and the relatively dry oxidant gas) can then be introduced back into the fuel cell system 210, and more specifically, either of the first, second and/or third fuel cell stacks 216, 218, 220, respectively.

Figure 4:
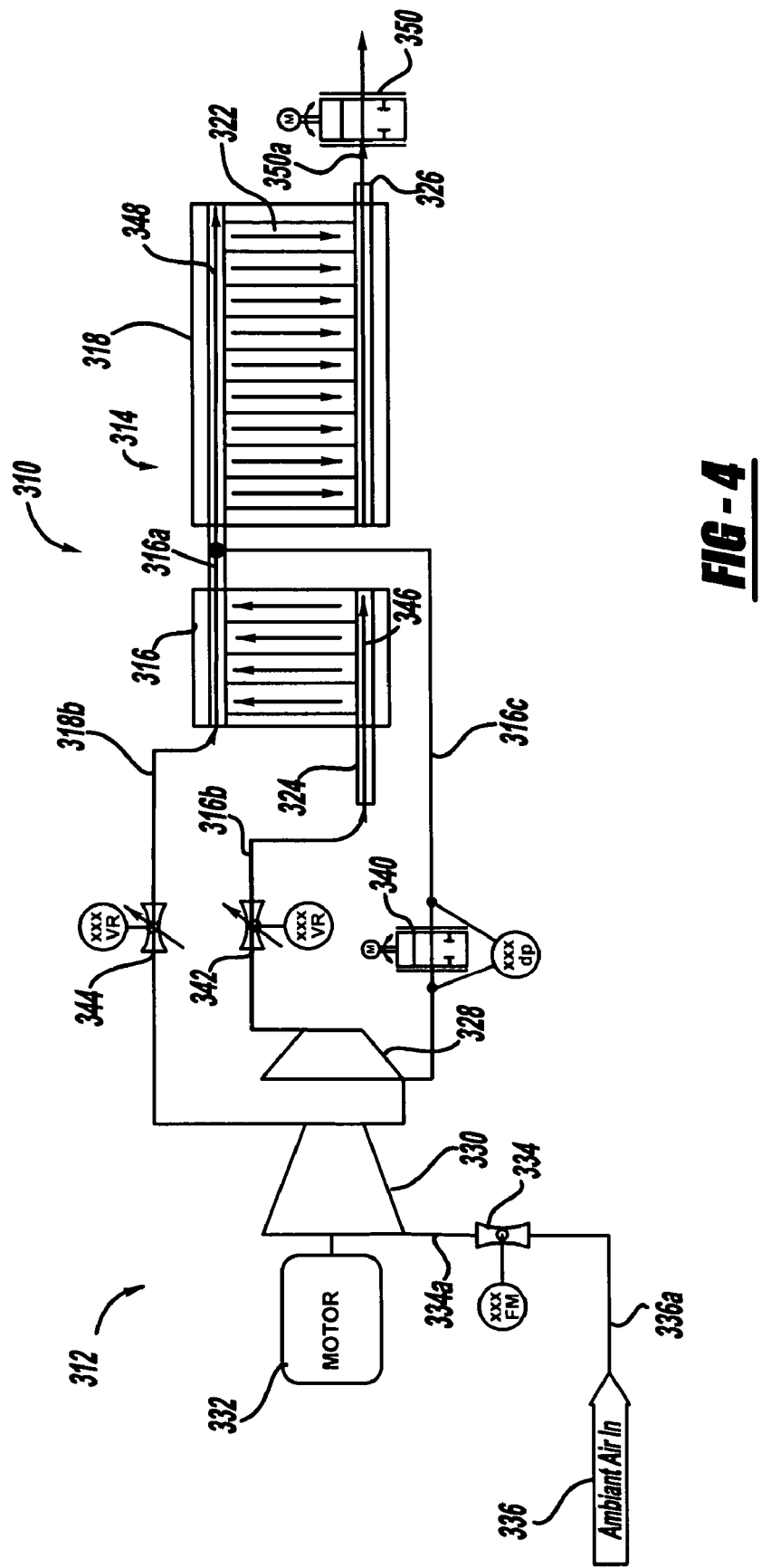
FIG. 4 is a schematic illustration of a two stack fuel cell system having a humidification/gas recirculation system operably associated with the cathode side, in accordance with the general teachings of the present invention.

Referring to FIG. 4, there is shown a schematic illustration of a two stack fuel cell system 310 having a humidification system 312 operably associated with the stack cathode flow 314 side, in accordance with a third alternative embodiment of the present invention.

The fuel cell system 310 includes two fuel cell stacks, 316, 318, respectively, that are in fluid communication with one another. The fuel cell stacks 316, 318, respectively, are comprised of a number of individual fuel cell elements 322. The number of fuel cell elements 322 can be varied among the fuel cell stacks 316, 318, respectively. Conduit 316a can be provided to provide fluid communication between fuel cell stack 316 and fuel cell stack 318.

Fuel cell stack 316 is provided with an oxidant gas inlet 324 (e.g., an stack cathode inlet) operable to receive an amount of oxidant gas, and fuel cell stack 318 is provided with an exhaust outlet 326 (e.g., a stack cathode outlet) operable to exhaust an amount of exhaust gas. Fuel gas inlet 324 is in fluid communication with at least one compressor 328. Compressor 328 can also be operably associated and/or in fluid communication with another compressor 330. Compressors 328, 330, respectively, can be powered by motor 332.

Compressors 328, 330, respectively, can be in fluid communication with a flow meter 334, via conduit 334a, which is in fluid communication with an oxidant gas storage/supply source 336, e.g., via conduit 336a. By way of a non-limiting example, the oxidant gas can be comprised of air, e.g., ambient air.

In this embodiment, the compressors 328, 330, respectively, and any associated components as previously described, comprise the humidification/gas recirculation system 312. However, instead of employing pumps, ejectors and/or injectors, the humidification/gas recirculation system 312 employs the compressors 328, 330, respectively to accomplish the recirculation function.

Compressors 328, 330, respectively, are in fluid communication, either directly or indirectly, with any of the fuel cell stacks, 316, 318, respectively, e.g. through conduits 316b, 318b, respectively. A recycle flow control valve 340 can be disposed in conduit 316c and flow control valves 342, 344, respectively, can be disposed in conduits 316b, 318b, respectively. In this manner a direct input 346, 348, respectively, can be provided for fuel cell stacks 316, 318, respectively, from humidification/gas recirculation system 312, and more specifically compressors 328, 330, respectively. Additionally, a pressure control valve 350 can be provided that is in fluid communication with exhaust outlet 326, e.g., via conduit 350a.

Because the exhaust gas exiting the fuel cell system 310 is typically higher in moisture than the oxidant gas being introduced into the fuel cell system 310, the present invention employs the humidification/gas recirculation system 312, and more specifically the compressors, 328, 330, respectively, to provide a method for reintroducing the relatively moist and/or humid exhaust gas (e.g., from conduit 316c) back into the first fuel stack 316 after it has exiting the first fuel cell stack 316. However, it should be appreciated that the exhaust gas can be re-circulated after it has exited the second fuel cell stack 318.

Due to the fact that the exhaust gas leaves the first fuel stack 316 (and subsequent fuel cell stacks) at a lower pressure than the incoming oxidant gas, humidification/gas recirculation system 312, and more specifically the compressors, 328, 330, respectively, are employed to mix both of the gas streams (i.e., the exhaust gas and the oxidant gas). The compressors, 328, 330, respectively, are operable to increase the pressure of the re-circulated exhaust gas to the required value. In this manner, the relatively dry incoming fuel gas can be mixed with at least a portion of the relatively moist and/or humid exhaust gas of either the first, second and/or third fuel cell stacks 316, 318, 320, respectively. Once mixed, the gas mixture (i.e., the relatively moist and/or humid exhaust gas and the relatively dry oxidant gas) can then be introduced back into the fuel cell system 310, and more specifically, either of the first and/or second fuel cell stacks 316, 318, respectively.

Some of the benefits of the present invention include, without limitation: (1) humidified inlet gas for all stages of the cascaded stack, which is expected to increase performance and durability; (2) cost reduction by eliminating the need for expensive external humidification devices (e.g., a water vapor transfer unit); (3) reducing the number of components in the fuel cell system, which reduces cost, system size and controls effort; and (4) reduced start-stop degradation by using a diluted gas supply.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system, comprising:
   a first fuel cell stack having a fuel or oxidant gas inlet operable to receive an amount of fuel or oxidant gas and a fuel or oxidant exhaust gas outlet operable to exhaust an amount of fuel or oxidant exhaust gas;
   a second fuel cell stack having a fuel or oxidant gas inlet operable to receive the fuel or oxidant exhaust gas from the first fuel cell stack and a fuel or oxidant exhaust gas outlet operable to exhaust an amount of fuel or oxidant exhaust gas; and
   a gas recirculation system in fluid communication with the first and second fuel cell stacks, wherein the gas recirculation system includes a gas recirculation device that operates to increase the pressure of a recirculation gas;
   wherein the gas recirculation device is selected from the group consisting of a pump, ejector, compressor and combinations thereof; and
   wherein the gas recirculation system is operable to receive the fuel or oxidant exhaust gas from the fuel or oxidant exhaust gas outlet of the second fuel cell stack and reintroduce the fuel or oxidant exhaust gas into the fuel or oxidant gas inlet of the first fuel cell stack;
   wherein the fuel or oxidant exhaust gas and the fuel or oxidant gas are combined in the gas recirculation device prior to being reintroduced into the first fuel cell stack, said gas recirculation device being operable to increase the pressure of the exhaust gas that enters the gas recirculation system;
   wherein the exhaust gas has a higher moisture level than the fuel or oxidant gas.

2. The invention according to claim 1, wherein the fuel or oxidant gas is comprised of a material selected from the group consisting of hydrogen, air, and combinations thereof.

3. The invention according to claim 1, wherein the exhaust gas and the fuel or oxidant gas are combined prior to being reintroduced into the first fuel stack system.

4. The invention according to claim 1, wherein the exhaust gas and the fuel or oxidant gas are combined in the gas recirculation system prior to being reintroduced into the first fuel cell stack.

5. The invention according to claim 1, further comprising a fuel or oxidant gas storage system in fluid communication with the gas recirculation system.

6. The invention according to claim 1, further comprising a flow control valve or flow meter operably associated with the gas recirculation system.

7. The invention according to claim 1, further comprising a pressure control valve operably associated with the exhaust gas outlet.

8. The invention according to claim 1, further comprising a third fuel cell stack disposed between the first and second fuel cell stacks, wherein the third fuel cell stack is in fluid communication with the first and second fuel cell stacks.

9. The invention according to claim 1, further comprising an anode portion, wherein the gas recirculation system is operably associated with the anode portion.

10. A fuel cell system, comprising:
a first fuel cell stack having a first fuel or oxidant gas inlet operable to receive an amount of fuel or oxidant gas and a first fuel or oxidant exhaust gas outlet operable to exhaust an amount of the fuel or oxidant exhaust gas;
a second fuel cell stack having a second fuel or oxidant gas inlet operable to receive the fuel or oxidant exhaust gas from the first exhaust gas outlet of the first fuel cell stack, and a second fuel or oxidant exhaust gas outlet operable to exhaust a fuel or oxidant exhaust gas from the second fuel cell stack;
a third fuel cell stack having a third fuel or oxidant gas inlet operable to receive the fuel or oxidant exhaust gas from the second exhaust gas outlet of the second fuel cell stack, and a third fuel or oxidant exhaust gas outlet operable to exhaust a fuel or oxidant exhaust gas from the third fuel cell stack; and
a gas recirculation system receiving the fuel or oxidant exhaust gas from the third fuel or oxidant exhaust gas outlet of the third fuel cell stack and reintroducing the fuel or oxidant exhaust gas from the third fuel cell stack into the first fuel or oxidant gas inlet of the first fuel cell stack wherein the gas recirculation system includes a gas recirculation device that operates to increase the pressure of a recirculation gas;
wherein the gas recirculation device is selected from the group consisting of a pump, ejector, compressor and combinations thereof; and
wherein the exhaust gas of the first fuel cell stack and the fuel or oxidant gas are combined in the gas recirculation device prior to being reintroduced into the first fuel cell stack, said gas recirculation device being operable to increase the pressure of the exhaust gas that enters the gas recirculation system;
wherein the exhaust gas has a higher moisture level than the fuel or oxidant gas.

11. The invention according to claim 10, wherein the fuel or oxidant gas is comprised of a material selected from the group consisting of hydrogen, air, and combinations thereof.

12. The invention according to claim 10, wherein the second fuel cell stack is in fluid communication with the gas recirculation system.

13. The invention according to claim 10, wherein the gas recirculation device is comprised of at least one compressor.

14. The invention according to claim 10, wherein the gas recirculation device is comprised of at least two compressors operably associated therebetween.

15. The invention according to claim 10, further comprising a motor operably associated with the gas recirculation device.

16. The invention according to claim 10, wherein the third fuel cell stack includes a fuel or oxidant gas inlet operable to receive an amount of fuel or oxidant gas and an exhaust gas outlet operable to exhaust an amount of exhaust gas.

17. The invention according to claim 10, wherein the third fuel cell stack is in fluid communication with the gas recirculation system.

18. The invention according to claim 10, wherein the exhaust gas of the first fuel cell stack and the fuel or oxidant gas are combined in the gas recirculation device prior to being reintroduced into any of the first, second, or third fuel cell stacks.

19. The invention according to claim 10, wherein the exhaust gas from the first fuel cell stack and the fuel or oxidant gas are combined prior to being reintroduced into the first fuel cell stack.

20. The invention according to claim 10, wherein the exhaust gas from the first fuel cell stack and the fuel or oxidant gas are combined in the gas recirculation system prior to being reintroduced into the first fuel cell stack.

21. The invention according to claim 10, further comprising a fuel or oxidant gas storage system in fluid communication with the gas recirculation system.

22. The invention according to claim 10, further comprising a flow control valve or flow meter operably associated with the gas recirculation system.

23. The invention according to claim 10, further comprising a pressure control valve operably associated with the exhaust gas outlet of the second fuel cell stack.

24. The invention according to claim 10, further comprising a cathode portion, wherein the gas recirculation system is operably associated with the cathode portion.

25. A method of operating a fuel cell system, comprising:
providing a first fuel cell stack having a fuel or oxidant gas inlet operable to receive an amount of fuel or oxidant gas and a fuel or oxidant exhaust gas outlet operable to exhaust an amount of fuel or oxidant exhaust gas;
providing a second fuel cell stack having a fuel or oxidant gas inlet operable to receive the fuel or oxidant exhaust gas from the first fuel cell stack and a fuel or oxidant exhaust gas outlet operable to exhaust an amount of fuel or oxidant exhaust gas; and
providing a gas recirculation system in fluid communication with the first and second fuel cell stacks;
providing a gas recirculation device within the gas recirculation system that operates to increase the pressure of a recirculation gas;
wherein the gas recirculation device is selected from the group consisting of a pump, ejector, compressor and combinations thereof; and
wherein the gas recirculation system is operable to receive the fuel or oxidant exhaust gas from the fuel or oxidant exhaust gas outlet of the second fuel cell stack and reintroduce the fuel or oxidant exhaust gas into the fuel or oxidant gas inlet of the first fuel cell stack;
wherein the fuel or oxidant exhaust gas and the fuel or oxidant gas are combined in the gas recirculation device prior to being reintroduced into the first fuel cell stack, said gas recirculation device being operable to increase the pressure of the exhaust gas that enters the gas recirculation system;
wherein the exhaust gas has a higher moisture level than the fuel or oxidant gas.

26. The invention according to claim 25, further comprising providing a fuel or oxidant gas storage system in fluid communication with the gas recirculation system.

27. The invention according to claim 25, further comprising providing a flow control valve or flow meter operably associated with the gas recirculation system.

28. The invention according to claim 25, further comprising providing a pressure control valve operably associated with the exhaust gas outlet.

29. The invention according to claim 25, further comprising providing a third fuel cell stack disposed between the first and second fuel cell stacks, wherein the third fuel cell stack is in fluid communication with the first and second fuel cell stacks.

30. The invention according to claim 25, further comprising providing an anode portion, wherein the gas recirculation system is operably associated with the anode portion.

31. A method of operating a fuel cell system, comprising:
providing a first fuel cell stack having a first fuel or oxidant gas inlet operable to receive an amount of fuel or oxidant gas and a first fuel or oxidant exhaust gas outlet operable to exhaust an amount of the fuel or oxidant exhaust gas;
providing a second fuel cell stack having a second fuel or oxidant gas inlet operable to receive the fuel or oxidant exhaust gas from the first exhaust gas outlet of the first fuel cell stack, and a second fuel or oxidant exhaust gas outlet operable to exhaust a fuel or oxidant exhaust gas from the second fuel cell stack;
providing a third fuel cell stack having a third fuel or oxidant gas inlet operable to receive the fuel or oxidant exhaust gas from the second exhaust gas outlet of the second fuel cell stack, and a third fuel or oxidant exhaust gas outlet operable to exhaust a fuel or oxidant exhaust gas from the third fuel cell stack; and
providing a gas recirculation system that receives the fuel or oxidant exhaust gas from the third fuel or oxidant exhaust gas outlet of the third fuel cell stack and reintroduces the fuel or oxidant exhaust gas from the third fuel cell stack into the first fuel or oxidant gas inlet of the first fuel cell stack;
providing a gas recirculation device within the gas recirculation system that operates to increase the pressure of a recirculation gas;
wherein the gas recirculation device is selected from the group consisting of a pump, ejector, compressor and combinations thereof; and
wherein the exhaust gas and the fuel or oxidant gas are combined in the gas recirculation device prior to being reintroduced into the first fuel cell stack, said gas recirculation device being operable to increase the pressure of the exhaust gas;
wherein the exhaust gas has a higher moisture level than the fuel or oxidant gas.

32. The invention according to claim 31, wherein the gas recirculation system is comprised of at least one compressor.

33. The invention according to claim 31, further comprising providing a motor operably associated with the gas recirculation system.

34. The invention according to claim 31, wherein the third fuel cell stack includes a fuel or oxidant gas inlet operable to receive an amount of fuel or oxidant gas and an exhaust gas outlet operable to exhaust an amount of exhaust gas.

35. The invention according to claim 31, wherein the third fuel cell stack is in fluid communication with the gas recirculation system.

36. The invention according to claim 31, wherein the exhaust gas of the first fuel cell stack and the fuel or oxidant gas are combined in the gas recirculation system prior to being reintroduced into any of the first, second, or third fuel cell stacks.

37. The invention according to claim 31, wherein the exhaust gas from the first fuel cell stack and the fuel or oxidant gas are combined prior to being reintroduced into the first fuel cell stack.

38. The invention according to claim 31, wherein the exhaust gas from the first fuel cell stack and the fuel or oxidant gas are combined in the gas recirculation system prior to being reintroduced into the first fuel cell stack.

39. The invention according to claim 31, further comprising providing a fuel or oxidant gas storage system in fluid communication with the gas recirculation system.

40. The invention according to claim 31, further comprising providing a flow control valve or flow meter operably associated with the gas recirculation system.

41. The invention according to claim 31, further comprising providing a pressure control valve operably associated with the exhaust gas outlet of the second fuel cell stack.

42. The invention according to claim 31, further comprising providing a cathode portion, wherein the gas recirculation system is operably associated with the cathode portion.

* * * * *